United States Patent
Sadri et al.

(10) Patent No.: US 12,388,519 B2
(45) Date of Patent: Aug. 12, 2025

(54) MULTI-BAND MIMO REPEATER SYSTEM WITH CARRIER AGGREGATION CAPABILITY

(71) Applicant: Airgain, Inc., San Diego, CA (US)

(72) Inventors: Ali Sadri, San Diego, CA (US); Behrouz Babakhani, San Diego, CA (US); Cheng-Yuan Chin, San Diego, CA (US); Devis Iellici, Cambridge (GB); Shenjie Miao, San Diego, CA (US)

(73) Assignee: Airgain, Inc., San Diego, CA (US)

( * ) Notice: Subject to any disclaimer, the term of this patent is extended or adjusted under 35 U.S.C. 154(b) by 18 days.

(21) Appl. No.: 18/581,034

(22) Filed: Feb. 19, 2024

(65) Prior Publication Data

US 2024/0291553 A1 Aug. 29, 2024

Related U.S. Application Data (60) Provisional application No. 63/448,153, filed on Feb. 24, 2023.

(51) Int. Cl.
*H04B 7/0413* (2017.01)
*H04B 7/155* (2006.01)

(52) U.S. Cl.
CPC ....... *H04B 7/15507* (2013.01); *H04B 7/0413* (2013.01)

(58) Field of Classification Search
CPC .............. H04B 7/15507; H04B 7/0413
See application file for complete search history.

(56) References Cited

U.S. PATENT DOCUMENTS

| | | | |
|---|---|---|---|
| 8,737,509 B2 | 5/2014 | Yu | |
| 9,363,797 B2 | 6/2016 | Freda | |
| 10,250,290 B2 | 4/2019 | Khlat | |
| 10,326,510 B2 | 6/2019 | Ko | |
| 10,455,561 B2 | 10/2019 | Oh | |
| 2015/0085708 A1 | 3/2015 | Khlat | |
| 2016/0276748 A1 | 9/2016 | Ramachandran | |
| 2018/0019768 A1 | 1/2018 | King | |
| 2020/0336199 A1 | 10/2020 | Ashworth | |
| 2021/0099205 A1 | 4/2021 | Seyed | |
| 2023/0011531 A1 | 1/2023 | Black | |
| 2023/0361855 A1* | 11/2023 | Hatamian | H04B 7/15507 |

OTHER PUBLICATIONS

International Patent Application No. PCT/US2024/016346, filed Feb. 19, 2024; International Search Report / Written Opinion issued May 31, 2024; 13 pages.

* cited by examiner

*Primary Examiner* — Rahel Guarino
(74) *Attorney, Agent, or Firm* — Mueting Raasch Group (57) ABSTRACT

A repeater comprises a plurality of donor antennas and a plurality of service antennas. The repeater comprises a plurality of signal processing paths each comprising a first transceiver coupled to at least one of the donor antennas, a second transceiver coupled to at least one of the service antennas, and a digital signal processor coupled to the first and second transceivers. A controller is coupled to the plurality of signal processing paths. The controller is adapted to configure the repeater for a multiple-input-multiple-output (MIMO) operating mode and a carrier aggregation (CA) operating mode.

18 Claims, 8 Drawing Sheets

MULTI-BAND MIMO REPEATER SYSTEM WITH CARRIER AGGREGATION CAPABILITY

CROSS-REFERENCE TO RELATED APPLICATION

This application claims the benefit of U.S. Provisional Patent Application No. 63/448,153, filed Feb. 24, 2023, which is incorporated herein by reference in its entirety.

SUMMARY

Various embodiments are directed to a repeater comprising a plurality of donor antennas and a plurality of service antennas. The repeater comprises a plurality of signal processing paths each comprising a first transceiver coupled to at least one of the donor antennas, a second transceiver coupled to at least one of the service antennas, and a digital signal processor coupled to the first and second transceivers. A controller is coupled to the plurality of signal processing paths. The controller is adapted to configure the repeater for a multiple-input-multiple-output (MIMO) operating mode and a carrier aggregation (CA) operating mode. For example, the controller can be adapted to configure the repeater for an N×N MIMO operating mode and an M CA operating mode, where N and M are positive integers equal to or greater than 2.

In some embodiments, a repeater comprises a plurality of donor antennas, a plurality of service antennas, and a plurality of signal processing paths each comprising a first transceiver coupled to at least one of the donor antennas, a second transceiver coupled to at least one of the service antennas, and a digital signal processor coupled to the first and second transceivers. A controller is coupled to the plurality of signal processing paths. The controller is adapted to configure the repeater for a MIMO operating mode and a CA operating mode using first firmware, the MIMO operating mode without the CA operating mode using second firmware, and the CA operating mode without the MIMO operating mode using third firmware.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Embodiments of the disclosure are directed to a multi-band MIMO repeater system with carrier aggregation capability. Various embodiments are directed to a digital repeater that includes a multi-transceiver architecture. Advantages of the multi-transceiver architecture include the capability of configuring a digital repeater to operate in different modes with a change in firmware but without the need to change circuitry (e.g., hardware components) of the repeater. For example, a repeater can be configured to implement a MIMO operating mode with carrier aggregation, a MIMO operating mode without carrier aggregation, or an operating mode with carrier aggregation but without a MIMO operating mode, by executing different firmware for each of the different operating modes. The flexibility and reconfigurability of the repeater's multi-transceiver architecture provides multiple options to meet the requirements of different carriers.

Embodiments of the disclosure are defined in the claims. However, below there is provided a non-exhaustive listing of non-limiting examples. Any one or more of the features of these examples may be combined with any one or more features of another example, embodiment, or aspect described herein.

Example Ex1. A digital repeater comprises a plurality of donor antennas, a plurality of service antennas, a plurality of signal processing paths each comprising a first transceiver coupled to at least one of the donor antennas, a second transceiver coupled to at least one of the service antennas, and a digital signal processor coupled to the first and second transceivers, and a controller coupled to the plurality of signal processing paths, the controller adapted to configure the repeater for a multiple-input-multiple-output (MIMO) operating mode and a carrier aggregation (CA) operating mode.

Example Ex2. The repeater of Ex1, wherein the controller is adapted to configure the repeater for an N×N MIMO operating mode and an M CA operating mode, where N and M are positive integers equal to or greater than 2.

Example Ex3. The repeater of Ex1, wherein the controller is adapted to configure the repeater for a 2×2 MIMO operating mode and a 2 CA operating mode.

Example Ex4. The repeater of Ex1, wherein the donor and service antennas are wideband antennas configured to receive radio frequency (RF) signals of at least a first frequency and a second frequency.

Example Ex5. The repeater of Ex4, wherein each of the wideband antennas is switchably coupled to at least two of the signal processing paths via a combiner/multiplexer.

Example Ex6. The repeater of Ex1, wherein at least a first set of the donor and service antennas are narrowband antennas configured to receive radio frequency (RF) signals of a first frequency, and at least a second set of the donor and service antennas are narrowband antennas configured to receive RF signals of a second frequency.

Example Ex7. The repeater of Ex1, wherein each of the signal processing paths is configured to process radio frequency signals having a unique combination of frequency and diversity relative to other signal processing paths.

Example Ex8. The repeater of Ex1, wherein a first signal processing path is configured to process radio frequency (RF) signals having a first frequency and a first diversity, a second signal processing path is configured to process RF signals having the first frequency and a second diversity, a third signal processing path is configured to process RF signals having a second frequency and the first diversity, and a fourth signal processing path is configured to process RF signals having the second frequency and the second diversity.

Example Ex9. The repeater of Ex1, wherein the controller is adapted to configure the repeater for the MIMO operating mode and the CA operating mode using first firmware, and the controller is adapted to configure the repeater for the MIMO operating mode without the CA operating mode using second firmware.

Example Ex10. The repeater of Ex1, wherein the controller is adapted to configure the repeater for a 2×2 MIMO operating mode and a 2 CA operating mode using first firmware, and the controller is adapted to configure the repeater for a 4×4 MIMO operating mode without the CA operating mode using second firmware.

Example Ex11. The repeater of Ex1, wherein the controller is adapted to configure the repeater for the MIMO operating mode and the CA operating mode using first firmware, and the controller is adapted to configure the repeater for the CA operating mode without the MIMO operating mode using third firmware.

Example Ex12. The repeater of Ex1, wherein the controller is adapted to configure the repeater for a 2×2 MIMO operating mode and a 2 CA operating mode using first firmware, and the controller is adapted to configure the repeater for a 4×4 CA operating mode without the MIMO operating mode using third firmware.

Example Ex13. A digital repeater comprises a plurality of donor antennas, a plurality of service antennas, and a plurality of signal processing paths each comprising a first transceiver coupled to at least one of the donor antennas, a second transceiver coupled to at least one of the service antennas, and a digital signal processor coupled to the first and second transceivers. A controller is coupled to the plurality of signal processing paths, the controller adapted to configure the repeater for a multiple-input-multiple-output (MIMO) operating mode and a carrier aggregation (CA) operating mode using first firmware, the MIMO operating mode without the CA operating mode using second firmware, and the CA operating mode without the MIMO operating mode using third firmware.

Example Ex14. The repeater of Ex13, wherein the controller is adapted to configure the repeater for a N×N MIMO operating mode and a M CA operating mode using the first firmware, a 2N×2N MIMO operating mode without the CA operating mode using the second firmware, and a 2M×2M CA operating mode without the MIMO operating mode using the third firmware, where N and M are positive integers equal to or greater than 2.

Example Ex15. The repeater of Ex13, wherein the controller is adapted to configure the repeater for a 2×2 MIMO operating mode and a 2 CA operating mode using the first firmware, a 4×4 MIMO operating mode without the CA operating mode using the second firmware, and a 4×4 CA operating mode without the MIMO operating mode using the third firmware.

Example Ex16. The repeater of Ex13, wherein the donor and service antennas are wideband antennas configured to receive radio frequency (RF) signals of at least a first frequency and a second frequency.

Example Ex17. The repeater of Ex16, wherein each of the wideband antennas is switchably coupled to at least two of the signal processing paths via a combiner/multiplexer.

Example Ex18. The repeater of Ex13, wherein at least a first set of the donor and service antennas are narrowband antennas configured to receive radio frequency (RF) signals of a first frequency, and at least a second set of the donor and service antennas are narrowband antennas configured to receive RF signals of a second frequency.

Figure 1A:
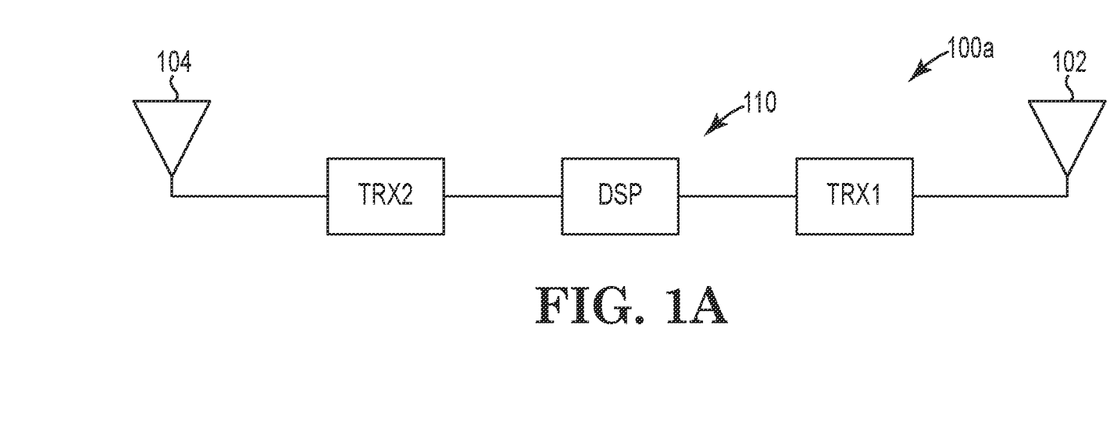
FIG. 1A is a block diagram of a repeater system in accordance with various embodiments.

FIG. 1A is a block diagram of a repeater system in accordance with various embodiments. The repeater system 100a shown in FIG. 1 includes a donor antenna 102 and a service antenna 104 each coupled to a signal processing path 110. The signal processing path 110 includes a first transceiver, TRX1, coupled to the donor antenna 102 and a second transceiver, TRX2, coupled to the service antenna 104. A digital signal processor, DSP, is coupled to the first transceiver, TRX1, and the second transceiver, TRX2.

Figure 1B:
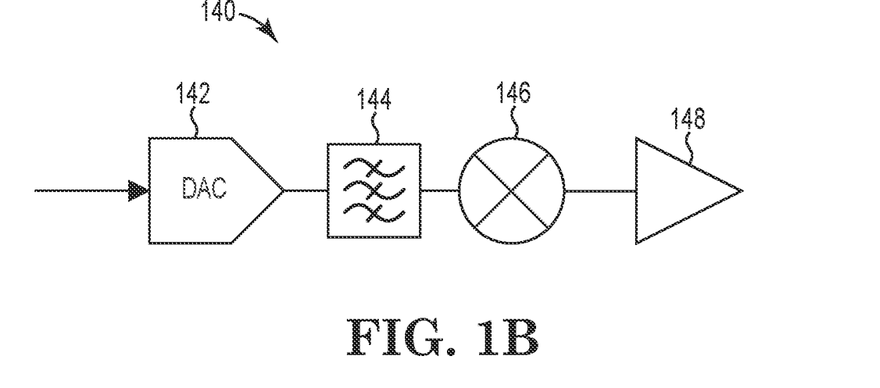
FIG. 1B is a block diagram of a transmitter (TX) chain of a transceiver (e.g., TRX1) shown in FIG. 1A.

FIG. 1B is a block diagram of a transmitter (TX) chain 140 of a transceiver (e.g., TRX1) shown in FIG. 1A. The transmitter chain 140 includes a digital-to-analog converter (DAC) 142 coupled to a filter 144. The filter 144 can be a low-pass filter, a band-pass filter, or a high-pass filter. The filter 144 is coupled to an up converter 146, and the upconverter 146 is coupled to a power amplifier (PA) 148. It is understood that the sequence of components shown in FIG. 1B can be different than illustrated. For example, the filter 144 can be positioned before or after the upconverter 146.

Figure 1C:
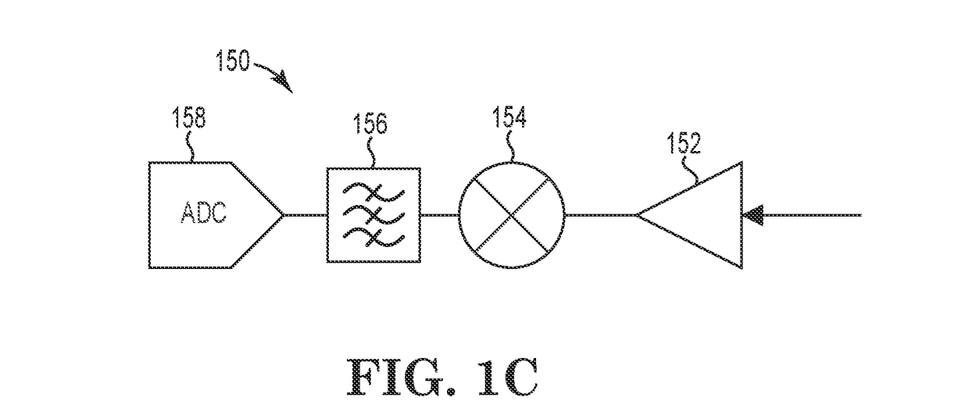
FIG. 1C is a block diagram of a receiver (RX) chain of a transceiver (e.g., TRX1) shown in FIG. 1A.

FIG. 1C is a block diagram of a receiver (RX) chain 150 of a transceiver (e.g., TRX1) shown in FIG. 1A. The receiver chain 150 includes a low-noise amplifier (LNA) 152 coupled to a down converter 154. The down converter 154 is coupled to a filter 156, and the filter 156 is coupled to an analog-to-digital converter (ADC) 158. The filter 144 can be a low-pass filter, a band-pass filter, or a high-pass filter. It is understood that the sequence of components shown in FIG. 1C can be different than illustrated. For example, the filter 156 can be positioned before or after the down converter 154.

According to some embodiments, each of TRX1 and TRX2 can be implemented as a dual radio frequency (RF) transceiver comprising dual differential transmitters and dual differential receivers. In some embodiments, TRX1 and TRX2 can support receiver bandwidths up to 100 MHz. Suitable RF transceivers for implementing TRX1 and TRX2 include: models ADRV9002, ADRV9004, ADRV9026, AD9361, and AD9371 available from Analog Devices; model DW1000 available from Qorvo, and model LMS7002M available from Lime Microsystems. The DSP can include, for example, one or more of a microprocessor, microcontroller, application specific integrated circuit (ASIC), Field Programmable Gate Array (FPGA), or any other processing device configured to interpret and/or to execute program instructions and/or to process data. The core components of the repeater system shown in FIGS. 1A-1C (e.g., TRX1-DSP-TRX2) are incorporated in other embodiments of this disclosure, and can have the same or different configuration as described above.

Figure 2:
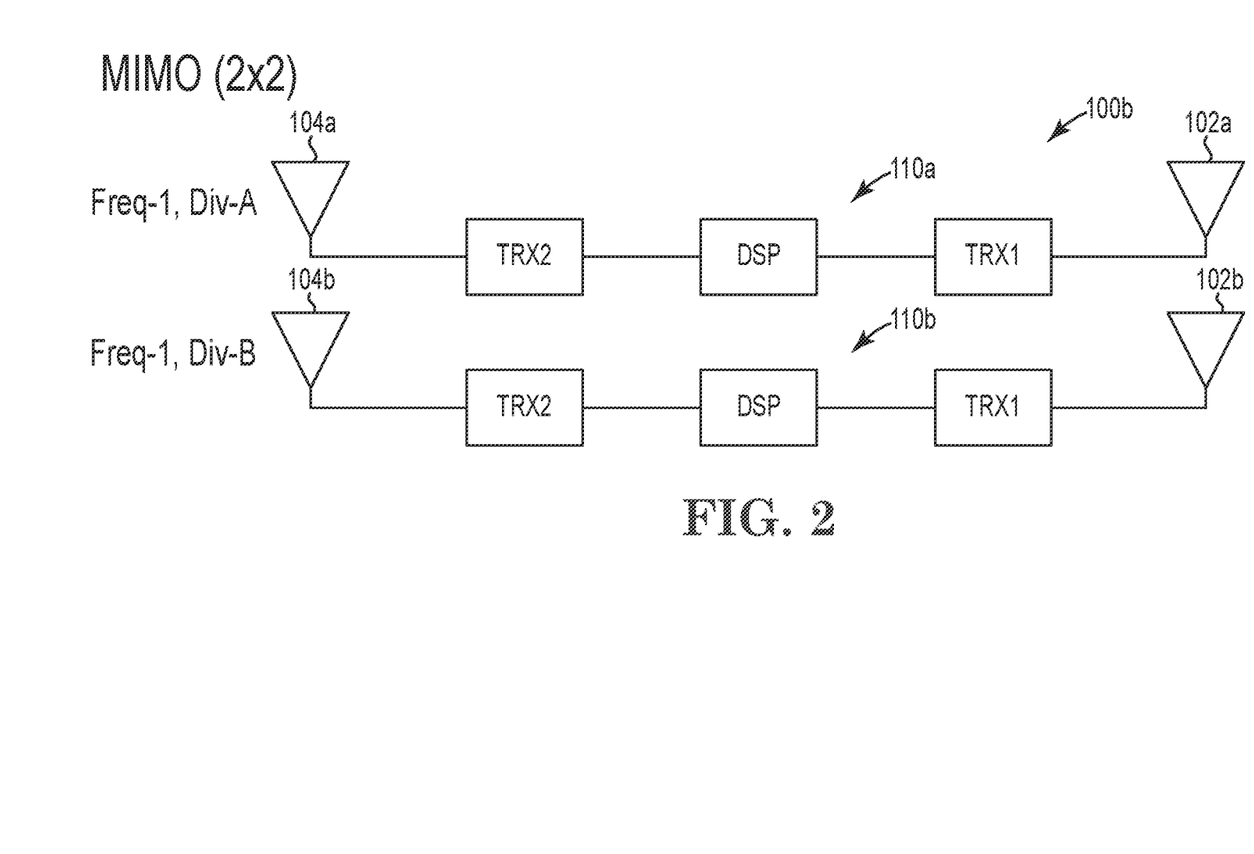
FIG. 2 is a block diagram of a MIMO repeater system in accordance with various embodiments.

FIG. 2 is a block diagram of a MIMO repeater system 100b which incorporates the core components of the repeater system shown in FIG. 1A. FIG. 2 illustrates a 2×2 MIMO repeater system 100b comprising two donor antennas 102a, 102b and two service antennas 104a, 104b. A first signal processing path 110a is coupled to donor antenna 102a and service antenna 104a. The first processing path 110a is configured to process RF signals having a first frequency (Freq-1) and a first diversity (Div-A). The term diversity can include polarization diversity and/or spatial diversity. A second signal processing path 110b is coupled to donor antenna 102b and service antenna 104b. The second processing path 110b is configured to process RF signals having the frequency (Freq-1) and a diversity (Div-B). The core components of the MIMO repeater system shown in FIG. 2 (e.g., redundant sets of TRX1-DSP-TRX2) are incorporated in other embodiments of this disclosure, and can have the same or different configuration as described above.

Figure 3:
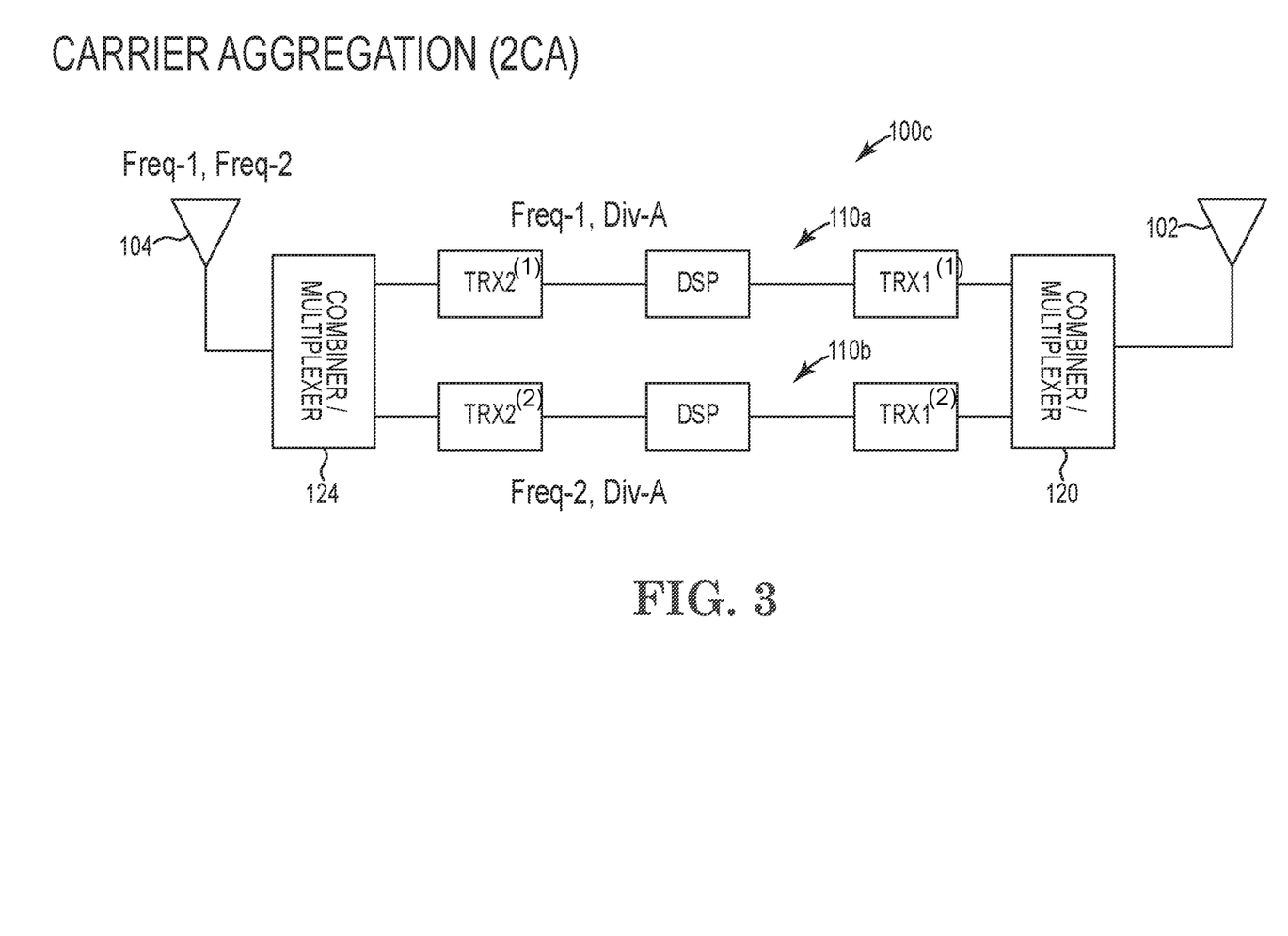
FIG. 3 is a block diagram of a repeater system adapted to implement carrier aggregation in accordance with various embodiments.

FIG. 3 is a block diagram of a repeater system adapted to implement carrier aggregation in accordance with various embodiments. There are various forms of carrier aggregation (e.g., as defined by 3GPP Release-10 of the LTE-Advanced standard), including intra-band adjacent CA, intra-band non-adjacent CA, and inter-band CA. In intra-band adjacent CA, aggregated component carriers (CCs) are within the same frequency band and adjacent to each other forming a contiguous frequency block. In intra-band non-adjacent CA, aggregated CCs are within the same frequency band but are not adjacent to each other. In inter-band CA, aggregated CCs are in different frequency bands. The maximum number of CCs and maximum bandwidth are generally limited as defined by a governing standard. For example, 3GPP Release-10 of the LTE-Advanced standard allows a maximum of five CCs to be allocated to a wireless communication device, such as repeater system 100c, at any given time. CCs can vary in size from 1.4 to 20 MHz, resulting in a maximum bandwidth of 100 MHz that can be allocated to the wireless communication device in the downlink/uplink.

In the illustrative embodiment shown in FIG. 3, the repeater system 100c is configured to implement carrier aggregation using two component carriers. The repeater system 100c includes a wideband donor antenna 102 and a wideband service antenna 104 for receiving and transmitting RF signals having a first frequency (Freq-1) and a second frequency (Freq-2). In this illustrative example, the RF signals have the same diversity (Div-A). A first combiner/multiplexer 120 is coupled to the donor antenna 102 and a second combiner/multiplexer 124 is coupled to the service antenna 104. The first and second combiner/multiplexers 120, 124 are configured to distribute RF signals having the first frequency (Freq-1) to signal processing path 110a and to distribute RF signals having the second frequency (Freq-2) to signal processing path 110b. The first and second combiner/multiplexers 120, 124 are also configured to combine RF signals transmitted along signal processing paths 110a and 110b for transmission by the donor and service antennas 102 and 104. The core components of the repeater system shown in FIG. 3 (e.g., redundant sets of TRX1-DSP-TRX2) are incorporated in other embodiments of this disclosure, and can have the same or different configuration as described above.

It is noted that the transceivers TRX1 and TRX2 of the different signal processing paths 110a, 110b include a superscript (1 or 2) to indicate that the transceivers TRX1 and TRX2 of the different signal processing paths 110a, 110b can be the same or different in terms of configuration. For example, TRX1(1) of signal processing path 110a may have the same or different LO frequency than TRX1(2) of signal processing path 110b. It is also noted that the transceivers TRX1 and TRX2 of the different signal processing paths shown in FIGS. 4, 5, and 7 also include a superscript (e.g., 1, 2, 3, 4) to indicate that the transceivers TRX1 and TRX2 of the different signal processing paths can be the same or different in terms of configuration.

Figure 4:
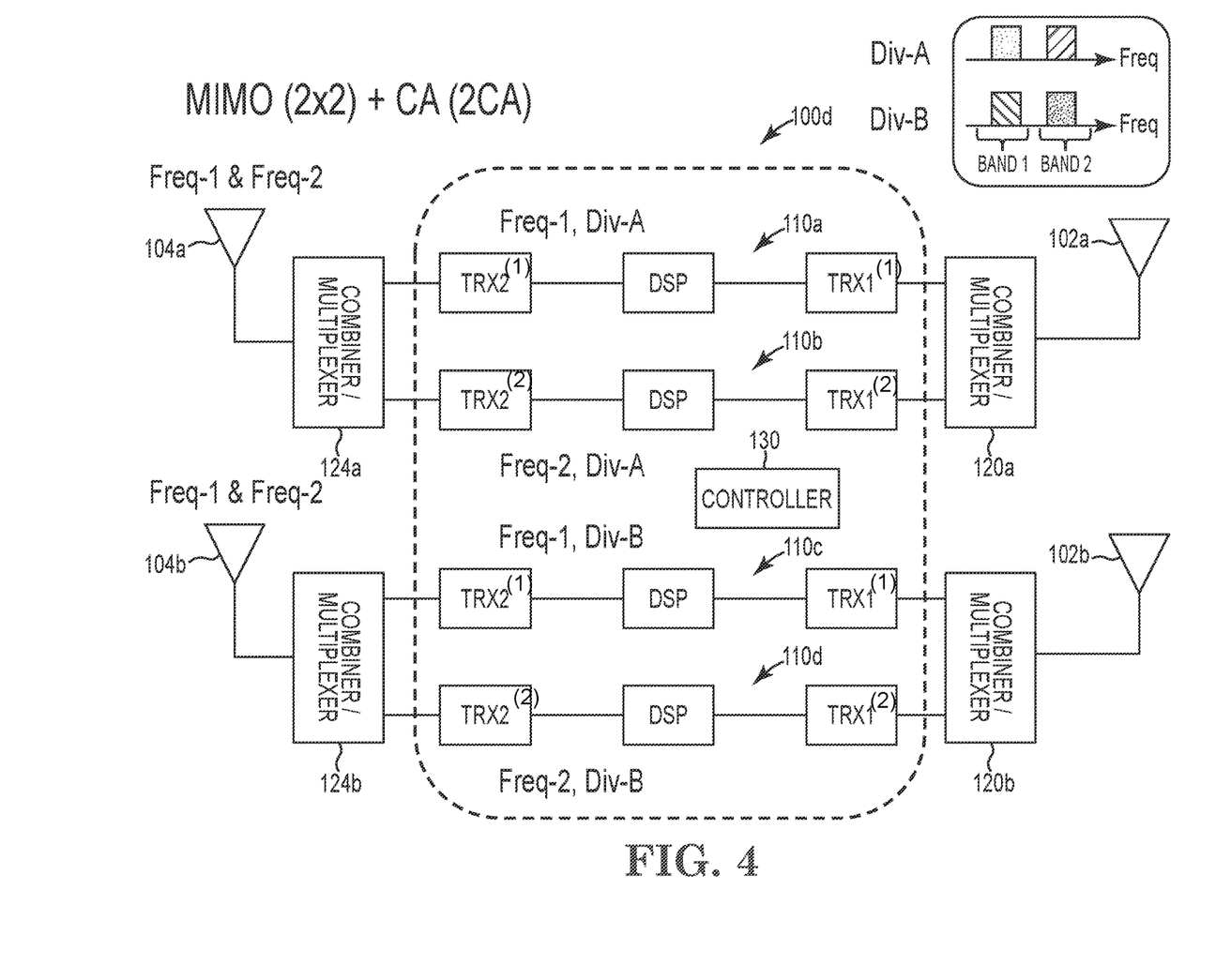
FIG. 4 is a block diagram of a MIMO repeater system adapted to implement carrier aggregation in accordance with various embodiments.

FIG. 4 is a block diagram of a MIMO repeater system adapted to implement carrier aggregation in accordance with various embodiments. In the illustrative embodiment shown in FIG. 4, the repeater system 100d includes a 2×2 MIMO repeater configured to implement carrier aggregation using two component carriers (2CA). The repeater system 100d includes wideband donor antennas 102a, 102b and wideband service antennas 104a, 104b for receiving and transmitting RF signals having a first frequency (Freq-1) and a second frequency (Freq-2). In this embodiment, donor and service antennas 102a, 104a receive and transmit RF signals having a first frequency (Freq-1) and a first diversity (Div-A). Donor and service antennas 102b, 104b receive and transmit RF signals having a second frequency (Freq-2) and a second diversity (Div-B).

A first combiner/multiplexer 120a is coupled to the donor antenna 102a and a second combiner/multiplexer 124a is coupled to the service antenna 104a. The first and second combiner/multiplexers 120a, 124a are configured to distribute RF signals having the first frequency (Freq-1) and the first diversity (Div-A) to signal processing path 110a and to distribute RF signals having the second frequency (Freq-2) and the first diversity (Div-A) to signal processing path 110b. The first and second combiner/multiplexers 120a, 124a are also configured to combine RF signals transmitted along signal processing paths 110a and 110b for transmission by the donor and service antennas 102a and 104a.

A third combiner/multiplexer 120b is coupled to the donor antenna 102b and a fourth combiner/multiplexer 124b is coupled to the service antenna 104b. The third and fourth combiner/multiplexers 120b, 124b are configured to distribute RF signals having the first frequency (Freq-1) and the second diversity (Div-B) to signal processing path 110c and to distribute RF signals having the second frequency (Freq-2) and the second diversity (Div-B) to signal processing path 110d. The third and fourth combiner/multiplexers 120b, 124b are also configured to combine RF signals transmitted along signal processing paths 110c and 110d for transmission by the donor and service antennas 102b and 104b.

A controller 130 is coupled to the signal processing paths 110a, 110b, 110c, 110d. The controller 130 is adapted to configure the repeater 100d for a MIMO operating mode and a carrier aggregation operating mode. In the illustrative example shown in FIG. 4, the controller 130 is adapted to configure the repeater 100d for a 2×2 MIMO operating mode and a 2CA operating mode.

Figure 5:
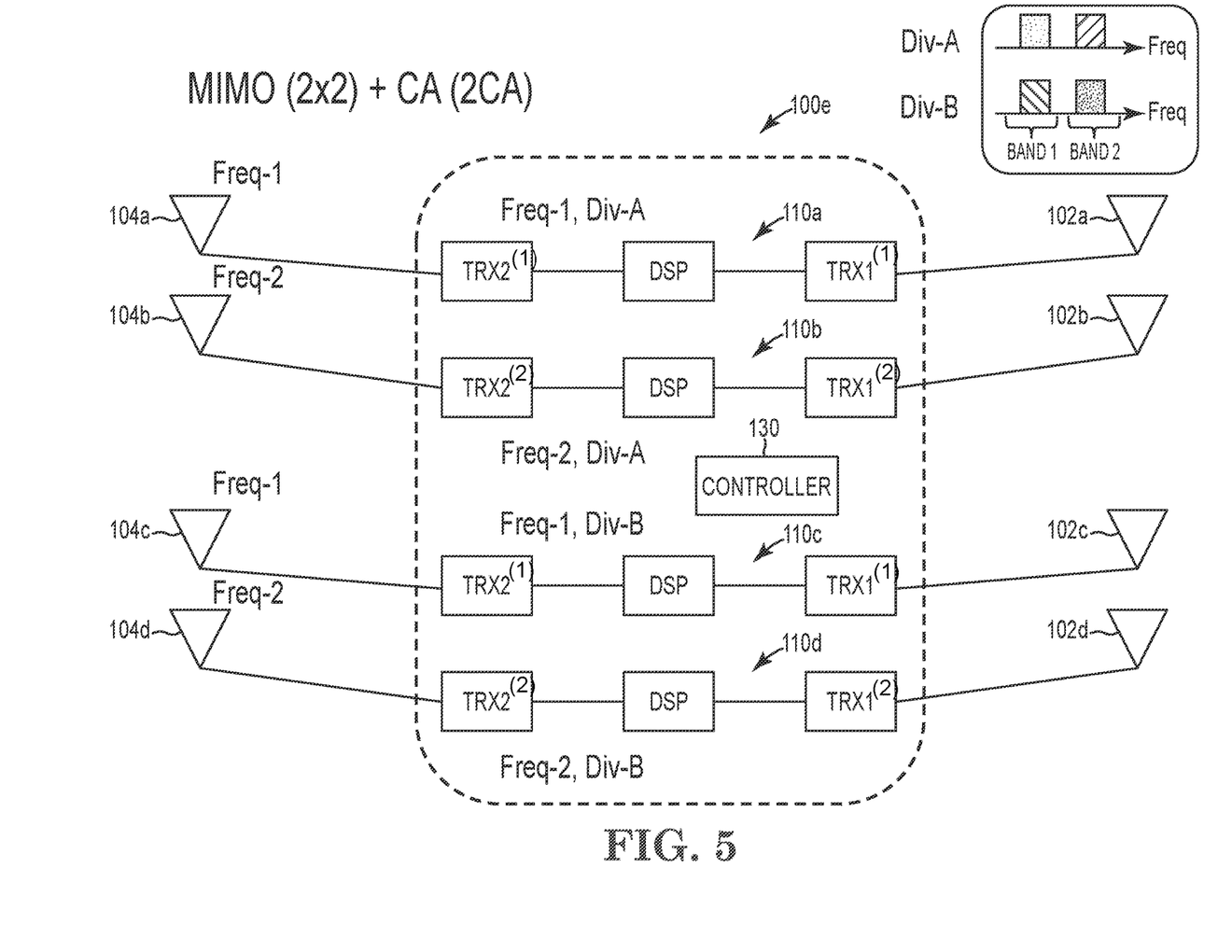
FIG. 5 is a block diagram of a MIMO repeater system adapted to implement carrier aggregation in accordance with various embodiments.

FIG. 5 is a block diagram of a MIMO repeater system adapted to implement carrier aggregation in accordance with various embodiments. In the illustrative embodiment shown in FIG. 5, the repeater system 100e includes a 2×2 MIMO repeater configured to implement carrier aggregation using two component carriers (2CA). The core components of the repeater 100e shown in FIG. 5 (e.g., redundant sets of TRX1-DSP-TRX2) are the same as those shown in FIG. 4.

The repeater 100e shown in FIG. 5 operates in the same manner as the repeater 100d shown in FIG. 4. In the embodiment shown in FIG. 5, the repeater 100e has twice the number of antennas as the repeater 100d shown in FIG. 4. As is shown in FIG. 5, each signal processing path 110a, 110b, 110c, 100d is coupled to one donor antenna and one service antenna. In particular, signal processing path 110a is coupled to donor antenna 102a and service antenna 104a, signal processing path 110b is coupled to donor antenna 102b and service antenna 104b, signal processing path 110c is coupled to donor antenna 102c and service antenna 104c, and signal processing path 110d is coupled to donor antenna 102d and service antenna 104d. In some implementations, as is in the case of repeater 100d shown in FIG. 4, it may be more cost effective to share antennas (e.g., wideband antennas) among individual signal processing paths by incorporating combiner/multiplexer components as shown in FIG. 4.

Figure 6:
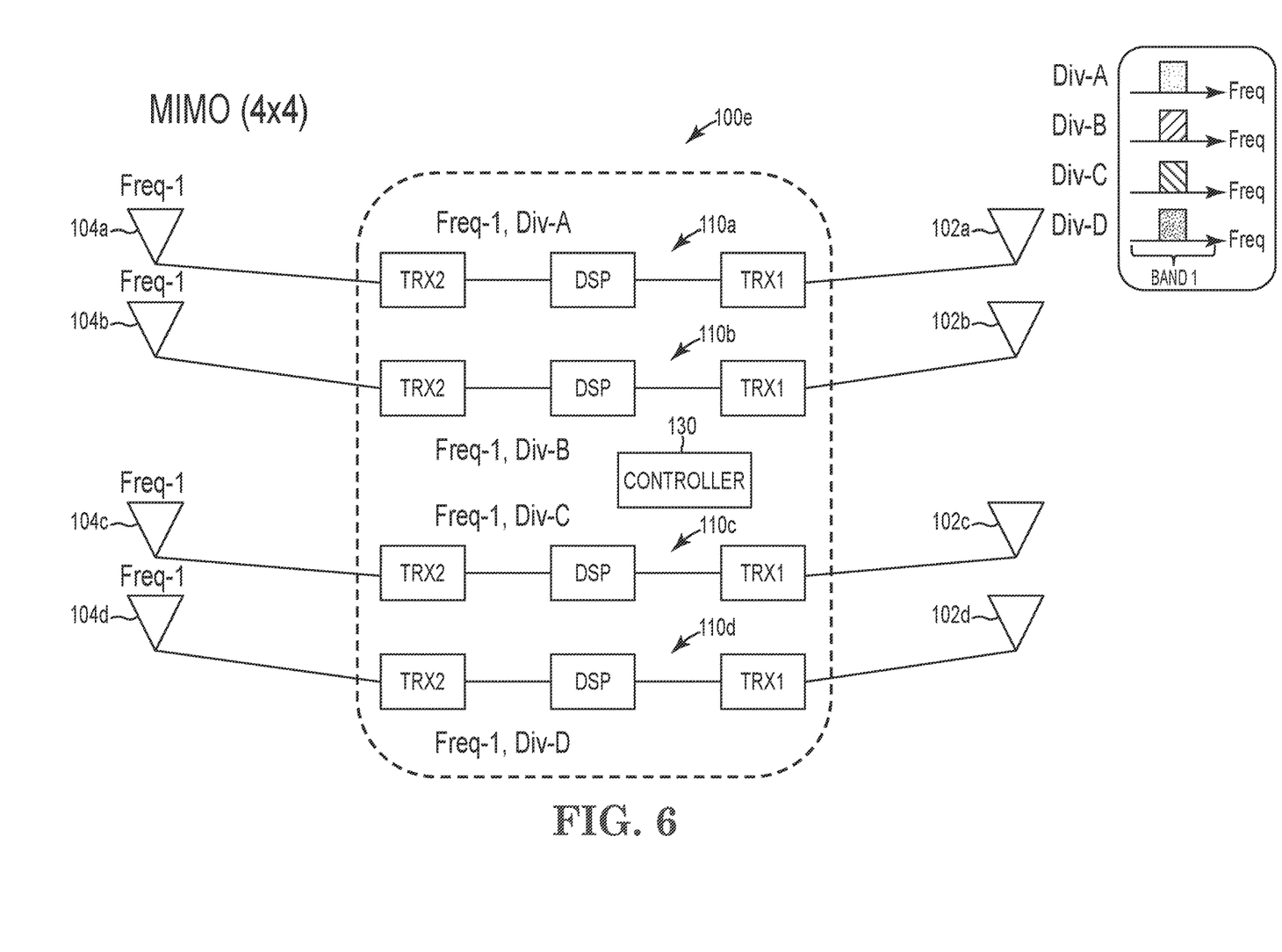
FIG. 6 is a block diagram of the repeater system shown in FIG. 5 which has been reconfigured to operate as a MIMO repeater using different firmware but with no change in circuitry in accordance with various embodiments.

As was previously discussed, the multi-transceiver architecture disclosed herein provides the capability of configuring a digital repeater to operate in different modes with a change in firmware but without the need to change circuitry of the repeater. In particular, the digital repeater can be operated in different modes without making a change to the core components (e.g., redundant sets of TRX1-DSP-TRX2) of the repeater. For example, the digital repeater can be configured to implement a MIMO operating mode with carrier aggregation (e.g., as shown in FIGS. 4 and 5), a MIMO operating mode without carrier aggregation (e.g., as shown in FIG. 6), or an operating mode with carrier aggregation but without a MIMO operating mode (e.g., as show in FIG. 7), via inclusion and execution of different firmware by the controller 130 for each of the different operating modes.

Figure 7:
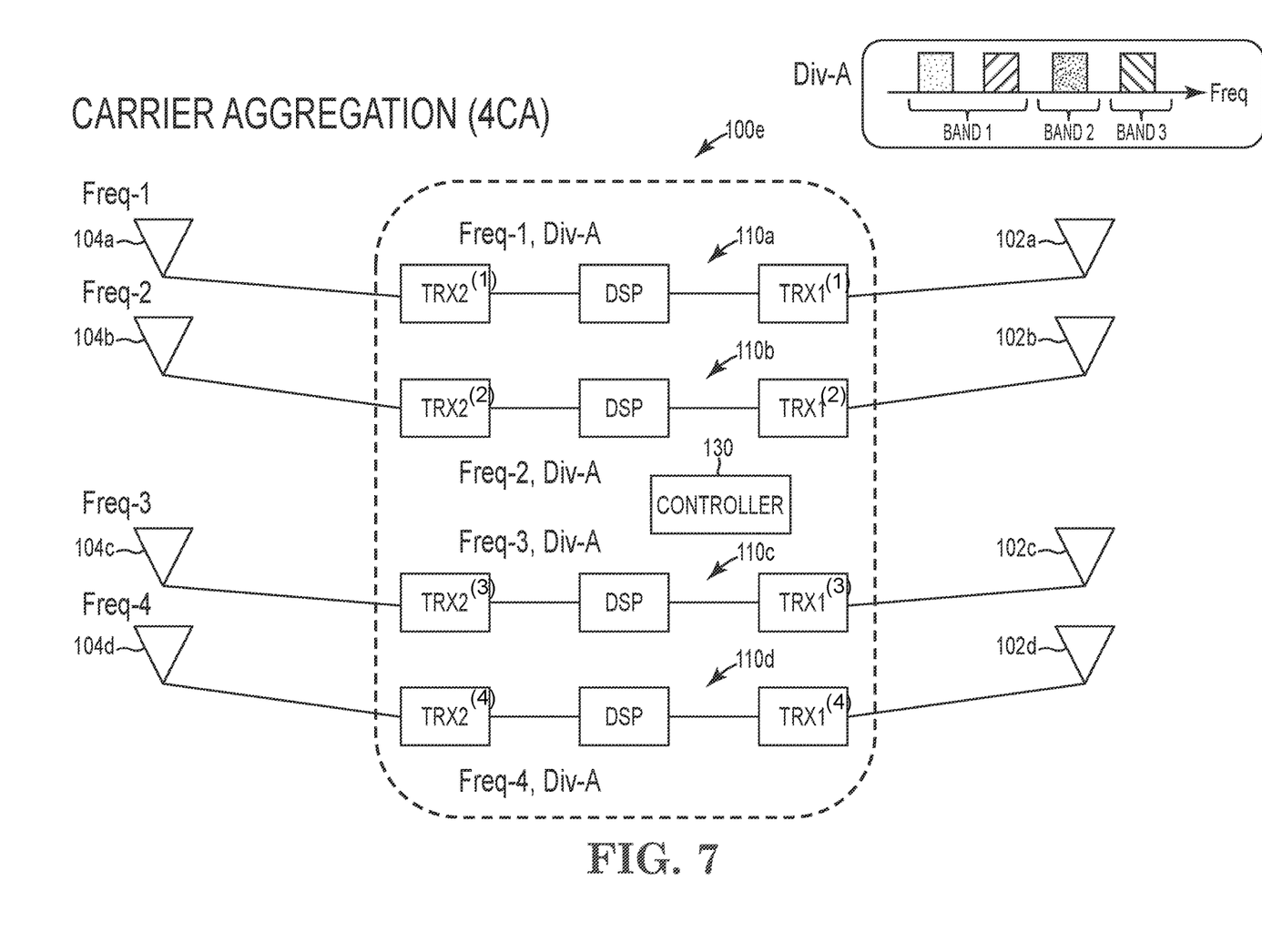
FIG. 7 is a block diagram of the repeater system shown in FIG. 5 which has been reconfigured to operate as repeater which implements carrier aggregation using different firmware but with no change in circuitry in accordance with various embodiments.

In the embodiment shown in FIG. 5, the controller 130 is adapted to configure the repeater 100e for a 2×2 MIMO operating mode and a 2CA operating mode using first firmware. In the embodiment shown in FIG. 6, the repeater 100e includes the same core components (e.g., redundant sets of TRX1-DSP-TRX2) and has the same antenna configuration as that shown in FIG. 5. In FIG. 6, the controller 130 is adapted to configure the repeater 100e for a MIMO operating mode without a CA operating mode using second firmware. In particular, the controller 130 is adapted to configure the repeater 100e for a 4×4 MIMO operating mode without the CA operating mode using second firmware. In the embodiment shown in FIG. 7, the repeater 100e includes the same core components (e.g., redundant sets of TRX1-DSP-TRX2) and has the same antenna configuration as that shown in FIGS. 5 and 6. In FIG. 7, the controller 130 is adapted to configure the repeater 100e for the CA operating mode without the MIMO operating mode using third firmware. In particular, the controller 130 is adapted to configure the repeater 100e for a 4×4 CA operating mode without the MIMO operating mode using third firmware.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed embodiments may be practiced other than as explicitly described herein. For example, a docking system may be installed on a surface of a vehicle other than the vehicle's roof (e.g., on the trunk).

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising." and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. A digital repeater, comprising:
   a plurality of donor antennas;
   a plurality of service antennas;
   a plurality of signal processing paths each comprising a first transceiver coupled to at least one of the donor antennas, a second transceiver coupled to at least one of the service antennas, and a digital signal processor coupled to the first and second transceivers; and
   a controller coupled to the plurality of signal processing paths, the controller adapted to configure the repeater for a multiple-input-multiple-output (MIMO) operating mode and a carrier aggregation (CA) operating mode.

2. The repeater of claim 1, wherein the controller is adapted to configure the repeater for an N×N MIMO operating mode and an M CA operating mode, where N and M are positive integers equal to or greater than 2.

3. The repeater of claim 1, wherein the controller is adapted to configure the repeater for a 2×2 MIMO operating mode and a 2 CA operating mode.

4. The repeater of claim 1, wherein the donor and service antennas are wideband antennas configured to receive radio frequency (RF) signals of at least a first frequency and a second frequency.

5. The repeater of claim 4, wherein each of the wideband antennas is switchably coupled to at least two of the signal processing paths via a combiner/multiplexer.

6. The repeater of claim 1, wherein:
   at least a first set of the donor and service antennas are narrowband antennas configured to receive radio frequency (RF) signals of a first frequency; and
   at least a second set of the donor and service antennas are narrowband antennas configured to receive RF signals of a second frequency.

7. The repeater of claim 1, wherein each of the signal processing paths is configured to process radio frequency signals having a unique combination of frequency and diversity relative to other signal processing paths.

8. The repeater of claim 1, wherein:
   a first signal processing path is configured to process radio frequency (RF) signals having a first frequency and a first diversity;
   a second signal processing path is configured to process RF signals having the first frequency and a second diversity;
   a third signal processing path is configured to process RF signals having a second frequency and the first diversity; and
   a fourth signal processing path is configured to process RF signals having the second frequency and the second diversity.

9. The repeater of claim 1, wherein:
   the controller is adapted to configure the repeater for the MIMO operating mode and the CA operating mode using first firmware; and
   the controller is adapted to configure the repeater for the MIMO operating mode without the CA operating mode using second firmware.

10. The repeater of claim 1, wherein:
    the controller is adapted to configure the repeater for a 2×2 MIMO operating mode and a 2 CA operating mode using first firmware; and
    the controller is adapted to configure the repeater for a 4×4 MIMO operating mode without the CA operating mode using second firmware.

11. The repeater of claim 1, wherein:
    the controller is adapted to configure the repeater for the MIMO operating mode and the CA operating mode using first firmware; and
    the controller is adapted to configure the repeater for the CA operating mode without the MIMO operating mode using third firmware.

12. The repeater of claim 1, wherein:
    the controller is adapted to configure the repeater for a 2×2 MIMO operating mode and a 2 CA operating mode using first firmware; and
    the controller is adapted to configure the repeater for a 4×4 CA operating mode without the MIMO operating mode using third firmware.

13. A digital repeater, comprising:
    a plurality of donor antennas;
    a plurality of service antennas;
    a plurality of signal processing paths each comprising a first transceiver coupled to at least one of the donor antennas, a second transceiver coupled to at least one of the service antennas, and a digital signal processor coupled to the first and second transceivers; and
    a controller coupled to the plurality of signal processing paths, the controller adapted to configure the repeater for:
       a multiple-input-multiple-output (MIMO) operating mode and a carrier aggregation (CA) operating mode using first firmware;
       the MIMO operating mode without the CA operating mode using second firmware; and
       the CA operating mode without the MIMO operating mode using third firmware.

14. The repeater of claim 13, wherein the controller is adapted to configure the repeater for:
    a N×N MIMO operating mode and a M CA operating mode using the first firmware;
    a 2N×2N MIMO operating mode without the CA operating mode using the second firmware; and
    a 2M×2M CA operating mode without the MIMO operating mode using the third firmware, where N and M are positive integers equal to or greater than 2.

15. The repeater of claim 13, wherein the controller is adapted to configure the repeater for:
    a 2×2 MIMO operating mode and a 2 CA operating mode using the first firmware;
    a 4×4 MIMO operating mode without the CA operating mode using the second firmware; and
    a 4×4 CA operating mode without the MIMO operating mode using the third firmware.

16. The repeater of claim 13, wherein the donor and service antennas are wideband antennas configured to receive radio frequency (RF) signals of at least a first frequency and a second frequency.

17. The repeater of claim 16, wherein each of the wideband antennas is switchably coupled to at least two of the signal processing paths via a combiner/multiplexer.

18. The repeater of claim 13, wherein:
    at least a first set of the donor and service antennas are narrowband antennas configured to receive radio frequency (RF) signals of a first frequency; and at least a second set of the donor and service antennas are narrowband antennas configured to receive RF signals of a second frequency.

* * * * *